United States Patent [19]
Sato et al.

[11] Patent Number: 5,589,952
[45] Date of Patent: Dec. 31, 1996

[54] DISC HIGH RESOLUTION SCANNER

[75] Inventors: Yasushi Sato, Chiba; Kaname Kamibayashi, Tokyo, both of Japan

[73] Assignee: Sony/Tektronix Corporation, Tokyo, Japan

[21] Appl. No.: 395,121

[22] Filed: Feb. 27, 1995

[30] Foreign Application Priority Data

Mar. 18, 1994 [JP] Japan .................................. 6-073899
Jun. 22, 1994 [JP] Japan .................................. 6-162895
Oct. 31, 1994 [JP] Japan .................................. 6-290529

[51] Int. Cl.$^6$ ..................................... H04N 1/08
[52] U.S. Cl. ........................... 358/487; 358/489; 348/96
[58] Field of Search ............................ 369/32, 36, 111, 369/264; 358/487, 489, 506, 491, 495; 348/96, 102; 353/110, DIG. 5; H04N 1/10, 1/16, 1/08

[56] References Cited

U.S. PATENT DOCUMENTS

| | | | |
|---|---|---|---|
| 4,642,703 | 2/1987 | Endo | 348/96 |
| 4,870,504 | 9/1989 | Ishida et al. | 358/489 |
| 4,980,781 | 12/1990 | Yamamoto et al. | 358/489 |
| 5,144,135 | 9/1992 | Hendrix et al. | |

FOREIGN PATENT DOCUMENTS

| | | |
|---|---|---|
| 62107573 | 11/1995 | Japan . |
| 62107574 | 11/1995 | Japan . |
| 62107575 | 11/1995 | Japan . |

OTHER PUBLICATIONS

"ChromaGraph DC 3000", Linotype–Hell, No. 001 194–1–3000 (AD).
"Sharp JX–610 Color Image Scanner".

*Primary Examiner*—Kim Yen Vu
*Attorney, Agent, or Firm*—Smith-Hill and Bedell

[57] ABSTRACT

A high resolution scanner apparatus has a disc upon which is mounted an original to be scanned. The disc may include a track for providing high accuracy tracing of the original. If the original is transparent, such as a photographic film, the disc may include a transparent first disc upon which the original is mounted and a second disc upon which a spiral track is provided, the first and second discs being mounted coaxially to rotate together. The discs may be compact or laser discs. A slide structure has at least a first arm for reading the original. The slide structure may include a second arm for tracing the track when included. The second arm may also include a light source for illuminating the original through the transparent first disc. The slide structure moves radially with respect to the discs, either using a precision controller or according to the tracing of the track by the second arm. If the original is not transparent, such as a printed original or a photographic film on a white sheet, a single disc may be used with the original mounted on one side and the optional track being on the other side. Then the first arm provides a light source for illuminating the original for reading using reflected light. The track may store bit clock information to allow a control circuit to rotate the disc(s) at a constant linear velocity.

18 Claims, 6 Drawing Sheets

DISC HIGH RESOLUTION SCANNER

BACKGROUND OF THE INVENTION

The present invention relates to a high resolution scanner, and in particular to a high resolution scanner using a disc, such as a laser disc or compact disc, to provide accurate traceability.

A typical scanner is a flatbed scanner based on charge coupled device (CCD) technology. An operator puts an original on the flatbed scanner to read or scan the image. The scanner illuminates the original with a scanning light from a light source and the CCD optically detects the passed or reflected light through or from the original. The resolution of the flatbed scanner depends on the density of the CCD and is limited by the mechanical accuracy of the scanning of the light source and optical detector. However high density CCDs may cause interference with light from adjacent pixels when each pixel of the CCD reads each pixel of the image of the original, thus degrading the image data. To eliminate this problem many and complicated scans of the image are required.

Another type of scanner is a drum scanner which may provide a high resolution image by reading each pixel of an image independently in space or in time. The drum scanner has a rotatable transparent drum and the original, such as a photographic film, is attached to the surface of the drum. The scanner also has a light source slidably placed on the rotation axis of the drum and an optical detector positioned parallel to the surface of the drum for reading the original. The light source and optical detector face each other via the cylindrical dram surface and move together along the axis of the dram to scan the original. The detector thus reads or scans the original while the dram rotates. The accuracy of the scanning mainly depends on the mechanical configuration between the light source and the detector relative to the drum. The position control mechanism keeps the drum structure in parallel to the rotation axis via a screw, and turns the screw using a motor to slide the light source and detector along the axis. The precise scan requires that the movement of the optical detector is a linear function of the rotation of the motor. As a result the screw needs to be milled precisely, with errors on the order of micrometers. The manufacturing of such a precise screw needs large machine tools which leads to high cost. A further disadvantage of the drum scanner is that the original source of the image being scanned needs to be flexible to fit around the surface of the drum.

What is desired is an inexpensive disc high resolution scanner that reads pixels independently in space or in time without requiring that the original source be flexible.

SUMMARY OF THE INVENTION

Accordingly the present invention provides a high resolution scanner using a disc for providing high accuracy traceability. The disc has a first surface upon which an original to be scanned is mounted. The disc may also have a second surface having a spiral track. A spindle motor rotates the disc. A slide structure has at least a first arm for reading the original on the first surface of the disc. A second arm may be provided for accurately tracing the optional track on the second surface of the disc. The slide structure is moved along the radial direction of the disc, either with a precision controller or in response to an output signal from the second arm. While the second arm traces the track on the second surface, the first arm reads the original with high resolution. A control circuit receives the output signal from the second arm to control the spindle motor and slide structure movement using servo control.

The disc may have either one disc or two discs according to the original type. If the original is transparent, such as photographic film, two discs may be used. The first disc has the first surface for mounting the original, and the second disc has the second surface with the accurate spiral track. The disc having the spiral track may be a compact or laser disc. The first arm of the slide structure reads the image of the original from the first disc, and the second arm traces the spiral track on the second disc. The second arm may have a light source for providing light to the original through a transparent portion of the first disc. If the original is not transparent or reflective, such as a printed image or a photographic film on a white sheet, the disc may be a single disc. The light source may be on the first arm to provide the light to the original in order to acquire the image efficiently. The spiral track may store bit clock information equivalent to what the compact or laser discs have, which allows the control circuit to rotate the disc at a constant linear velocity.

The objects, advantages and other novel features of the present invention are apparent from the following detailed description when read in conjunction with the appended claims and attached drawing.

DESCRIPTION OF THE PREFERRED EMBODIMENT

Figure 1:
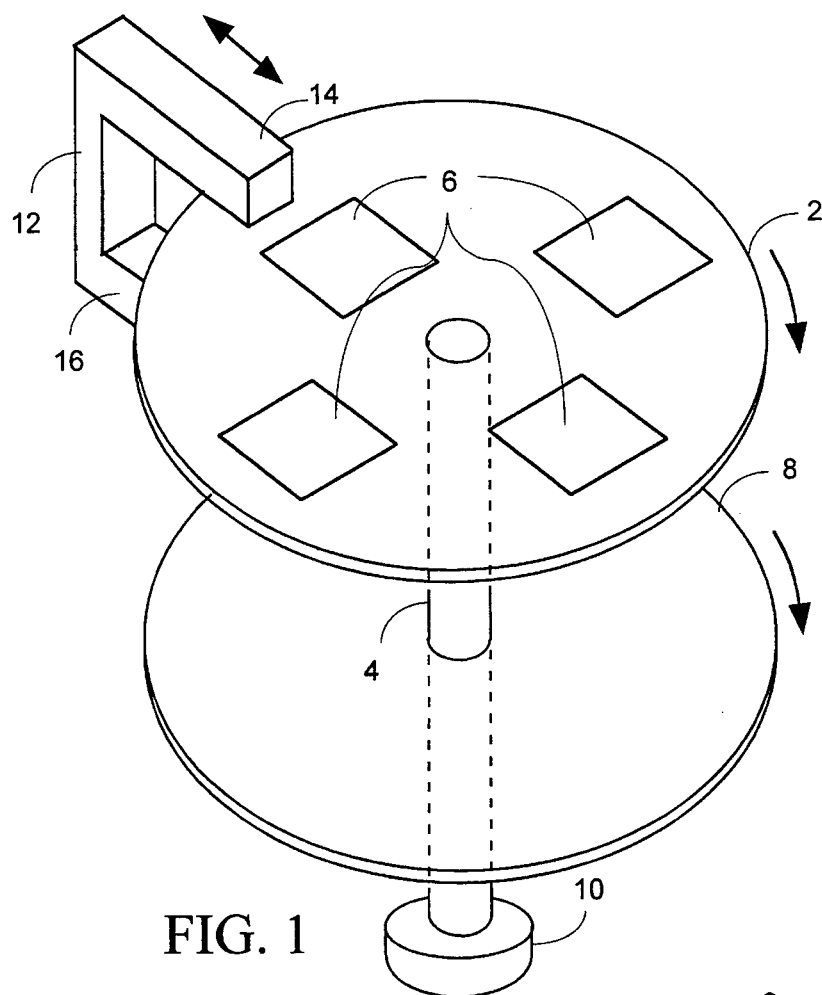
FIG. 1 is a perspective view of a first embodiment for the high resolution scanner according to the present invention.
Figure 2:
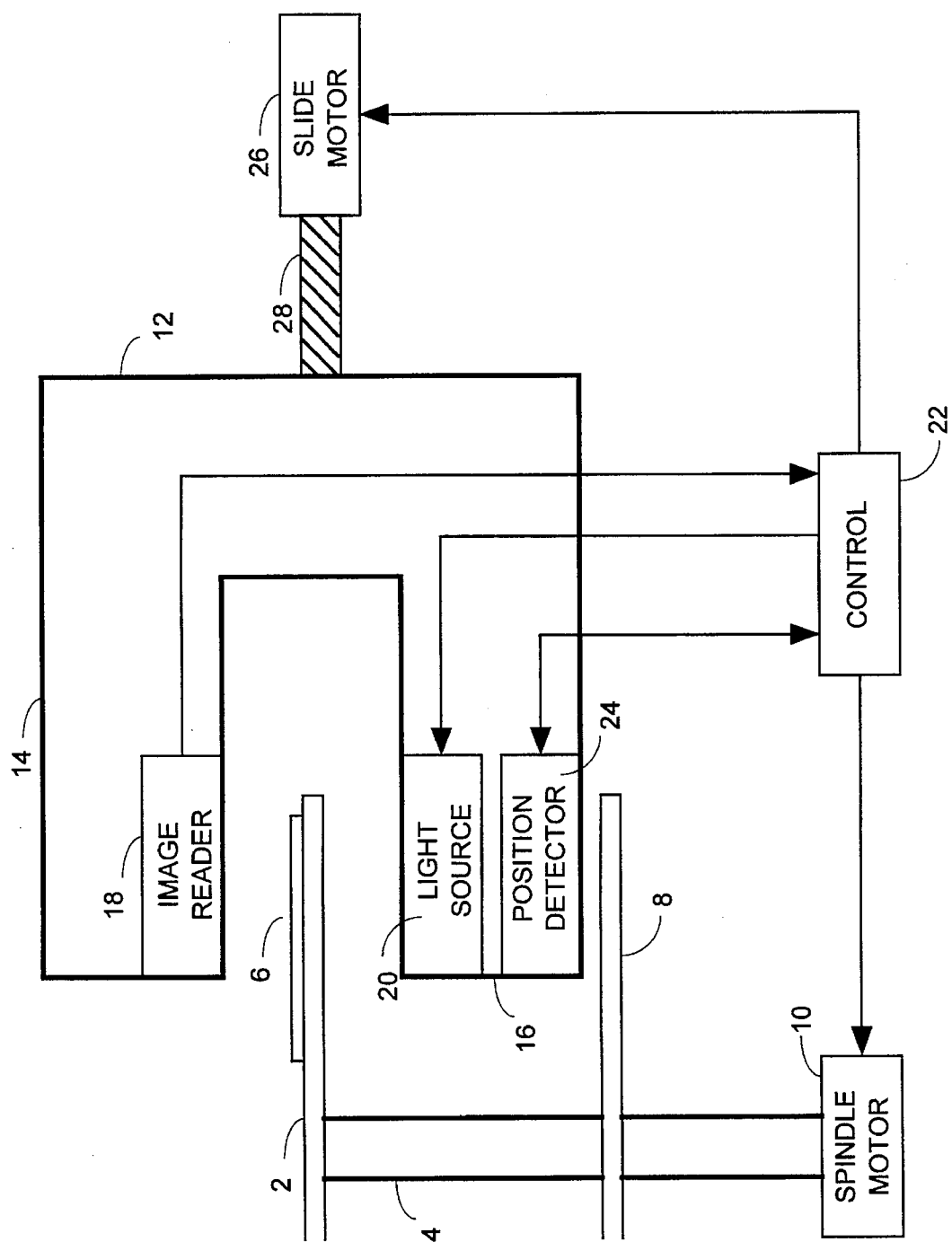
FIG. 2 is a schematic diagram view of the first embodiment for the high resolution scanner according to the present invention.

Referring now to FIGS. 1 and 2 a first embodiment is shown that is particularly suitable for scanning transparent originals, but also may be used for scanning reflective originals. A first disc 2 is mounted on an axle 4. The first disc 2 may be made of transparent material, such as glass or acrylic resin, so that at least the area beneath an original 6 is transparent. A plurality of originals 6 may be mounted on one surface of the first disc 2 over transparent areas. A second disc 8 also is mounted on the axle 4 coaxially with the first disc 2. The second disc 8 has a spiral track on the surface facing the first disc 2. The spiral track may be formed by laser cutting in a mass production process, and is substantially equivalent to what a laser or compact disc has on its surface. The spiral track is extremely precise and stores a digital signal or bit clock information in a projected portion between adjacent tracks. The interval or distance between adjacent tracks may be on the order of 1.6 microns, for example. The axle 4 is connected to a spindle motor 10 which drives the axle so that the discs 2, 8 rotate together about the common axis. A slide structure 12 is supported by a sliding mechanism that includes a screw 28 and a slide motor 26. The sliding mechanism causes the slide structure 12 to slide radially with respect to the discs 2, 8.

The slide structure 12 has two arms 14, 16, the upper arm being for reading the originals 6 optically and the lower arm being for tracing the spiral track on the surface of the second disc 8. The upper arm 14 has an optical image reader 18 attached thereto. The lower arm 16 has a light source 20 attached thereto so as to shine through the disc 2 and originals 6. The image reader 18 detects the light from the light source 20 through the transparent portion of the first disc 2 and the originals 6. The reader 18 converts the detected light into an electrical signal representative of the original, which electrical signal is routed to a control circuit 22.

If the originals 6 are not transparent, such as a printed image on paper or a photographic film on a white sheet, i.e., reflective originals, the image reader 18 may also have a light source. In that case the image reader 18 converts the detected reflected light to the electrical signal. The first disc 2 need not be transparent, nor is the light source 20 on the lower arm necessary. When the originals 6 are transparent while the first disc 2 is not, it is preferable to provide a white sheet or layer on the surface of the first disc beneath the originals to provide a more efficient reflection of the light to the reader 18.

The second arm 16 has a position detector or optical pick-up 24 attached to it so as to face the second disc 8 for tracing the spiral track. The optical pick-up 24 outputs a laser beam onto the spiral track and detects the reflected beam from the track to provide the control circuit 22 with a signal for tracing the track accurately. The control circuit 22 controls the spindle motor 10 which rotates the discs 2, 8, and controls the slide motor 26 for tracing the precise spiral track on the second disc. The axis of the slide motor 26 is connected to the slide screw 28 which supports the slide structure 12. The slide structure 12 moves radially with respect to the discs 2, 8 according to the rotation of the screw 28. The slide mechanism including the slide screw 28 does not require much precision because the control circuit 22 applies a servo control to the slide motor 26 for tracing the precise spiral track on the second disc 8. This precise servo control is used in the optical pick-up system of a compact disc player, as is well known to those skilled in the art.

The control circuit 22 controls the spindle motor 10 in order to keep the linear velocity of the disc 8 constant during the rotation at the position that the optical pick-up 24 is detecting. The spiral track stores rotation control information, or bit clock information, which the optical pick-up 24 reads out. Then the control circuit 22 keeps the frequency of the bit clock signal constant for the accurate servo control of the rotation. This constant linear velocity (CLV) technology also is well known to those skilled in the art of laser or compact disc players.

Figure 3:
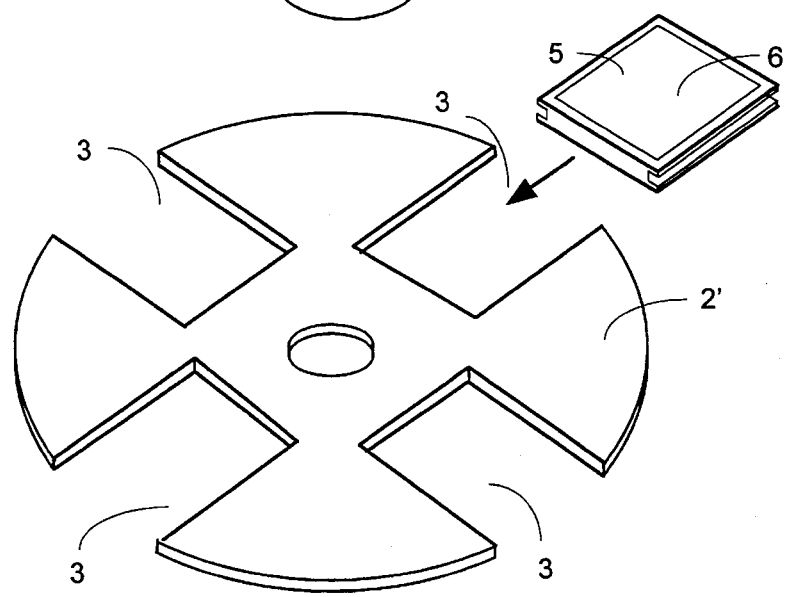
FIG. 3 is a perspective view of another configuration of a disc for the first embodiment according to the present invention.

In FIG. 3 another embodiment of the first disc 2' is shown. The disc 2' has a plurality of cutout regions 3 in the circumference, and a holder 5 is attached in each cutout region. The originals 6 are mounted on the holders 5. The disc 2' may secure the holders 5 by any suitable latch mechanism, for example. The holders 5 are readily removable and provide easy access for the originals 6 to the disc 2'. The holder 5 may be made of a transparent material, such as glass or acrylic resin. If the image reader 18 includes a light source, then the holder 5 need not be transparent, and a white sheet under the original 6 is preferred where the original is transparent, as discussed above.

Figure 4:
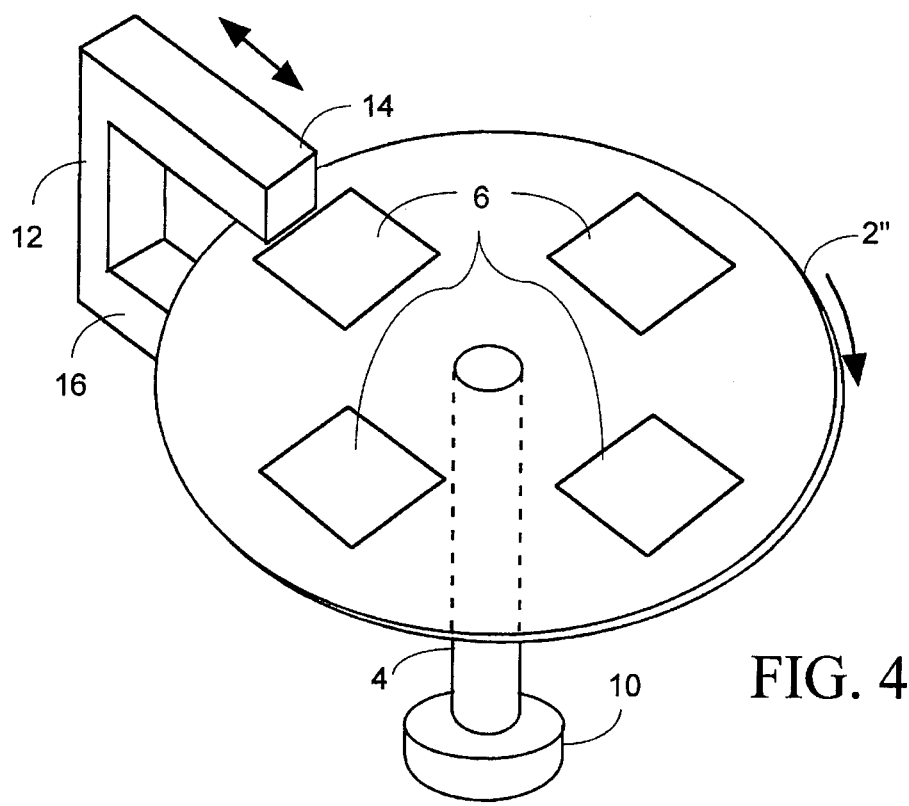
FIG. 4 is a perspective view of a second embodiment for the high resolution scanner according to the present invention.
Figure 5:
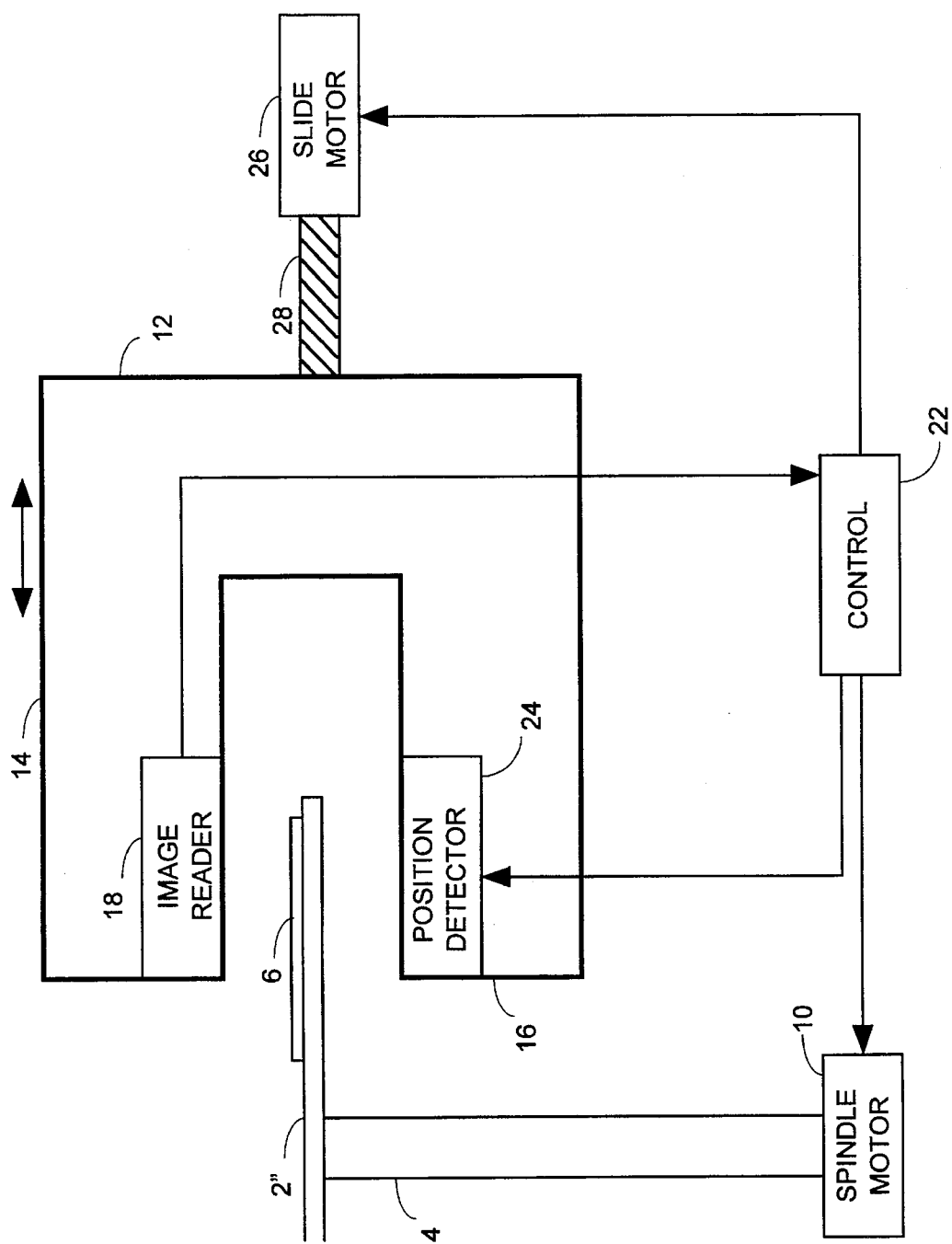
FIG. 5 is a schematic diagram view of the second embodiment for the high resolution scanner according to the present invention.

A single disc embodiment of the present invention is shown in FIGS. 4 and 5 which is especially suitable for scanning a reflective original 6. The disc 2", which is affixed to the axle 4 for rotation about the disc's axis when rotated by the spindle motor 10, may have the spiral track on the opposite surface from the surface upon which the originals 6 are placed for scanning. The slide structure 12 is the same as for the embodiment of FIGS. 1 and 2 except that the position detector 24 on the lower arm 16 faces the underside of the disc 2" and the image reader 18 in the upper arm 14 includes the light source. In this instance the material of the disc 2" may be non-transparent. The operation of this embodiment is the same as that described above with respect to the two disc embodiment.

Where no track is used on the second surface of the disc 2", then the slide structure may use only a single arm 14 for both illuminating and reading the original on the first surface of the disc. Where the original 6 is transparent and the material of the disc 2" also is transparent, the second arm 16 may be used to illuminate a transparent original through the disc. In this embodiment a precision controller is used to control the movement of the slide structure 12 radially across the disc 2".

Figure 6:
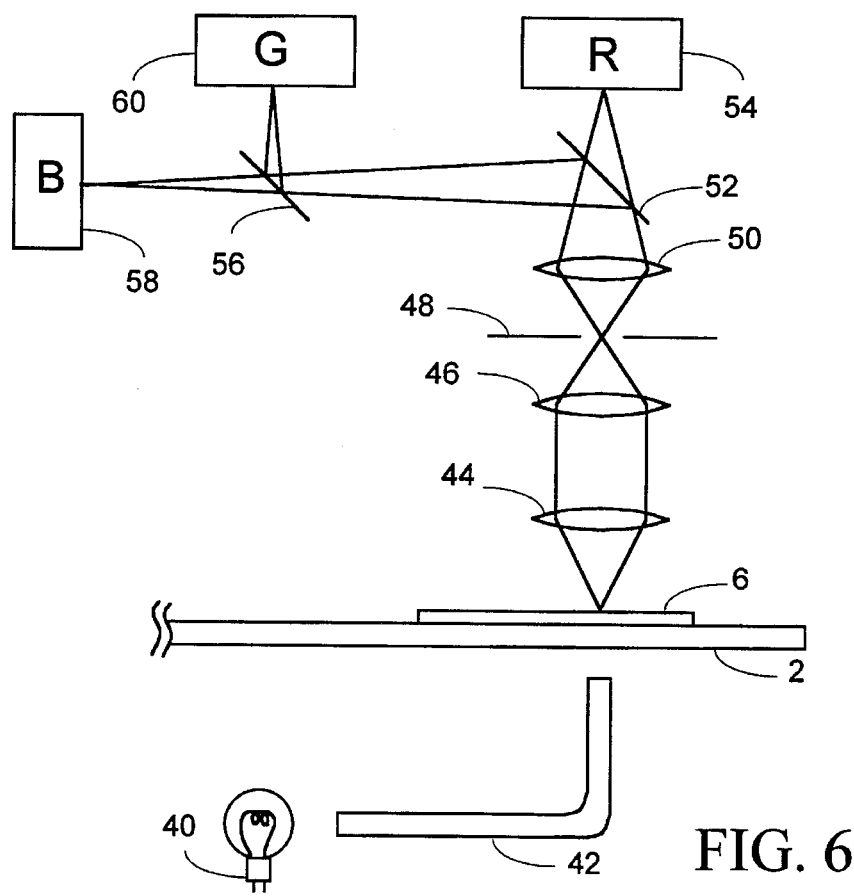
FIG. 6 is a schematic diagram view of an optical system for the first embodiment according to the present invention.

The optics of the image reader 18 and light source 20 according to the embodiment of FIGS. 1 and 2 is shown in FIG. 6. The light source 20 may be any broad spectrum light source, such as a halogen lamp 40, and a light supplier 42, such as a bundle of optical fibers. The light source 20 provides light beneath the disc 2 at the position of the image reader 18. The light from the light source 20 passes through the disc 2 and original 6, and then through an object lens 44 of the imager 18 which collects the light or image data as modulated by the original. The collected light passes first and second condensers 46, 50 through a pinhole 48 and reaches a dichroic mirror 52 which is transparent to a particular frequency of light only, such as red light. A red light detector 54 detects the light passed by the dichroic mirror 52. The reflected light from the dichroic mirror 52 reaches a second dichroic mirror 56 that is transparent to a second particular frequency of light only, such as blue light. A blue light detector 58 detects the passed blue light and a final light detector 60 detects the remaining reflected light, such as green for the example given. The three detected colors, such as the primary RGB colors, of the detectors 54, 58, 60 of the image reader 18 are converted into digital data that may be stored in a frame buffer memory (not shown) at a position corresponding to the scanned position of the data as determined by the position detector 24.

Figure 7:
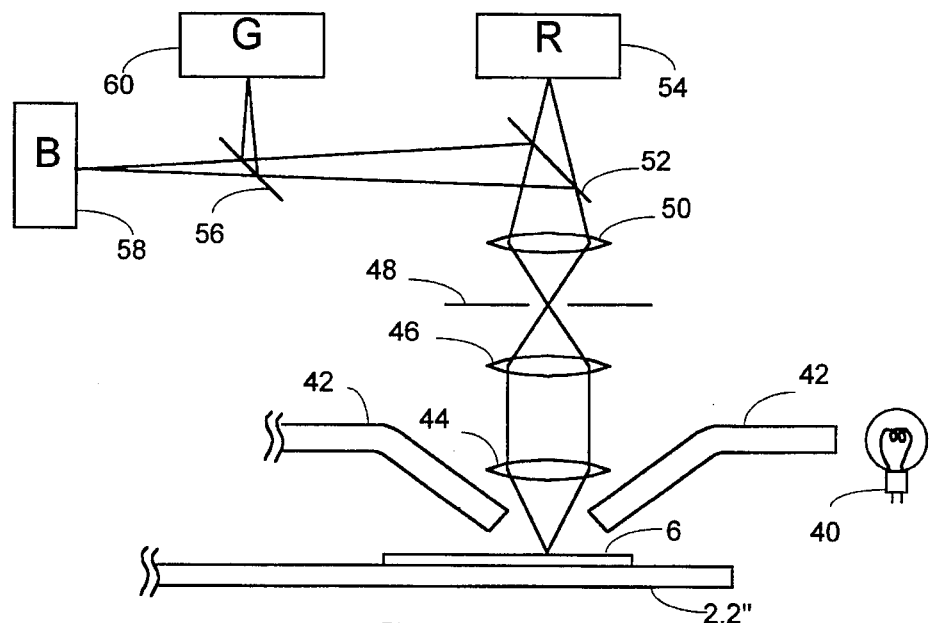
FIG. 7 is a schematic diagram view of an optical system for the second embodiment according to the present invention.
Figure 8:
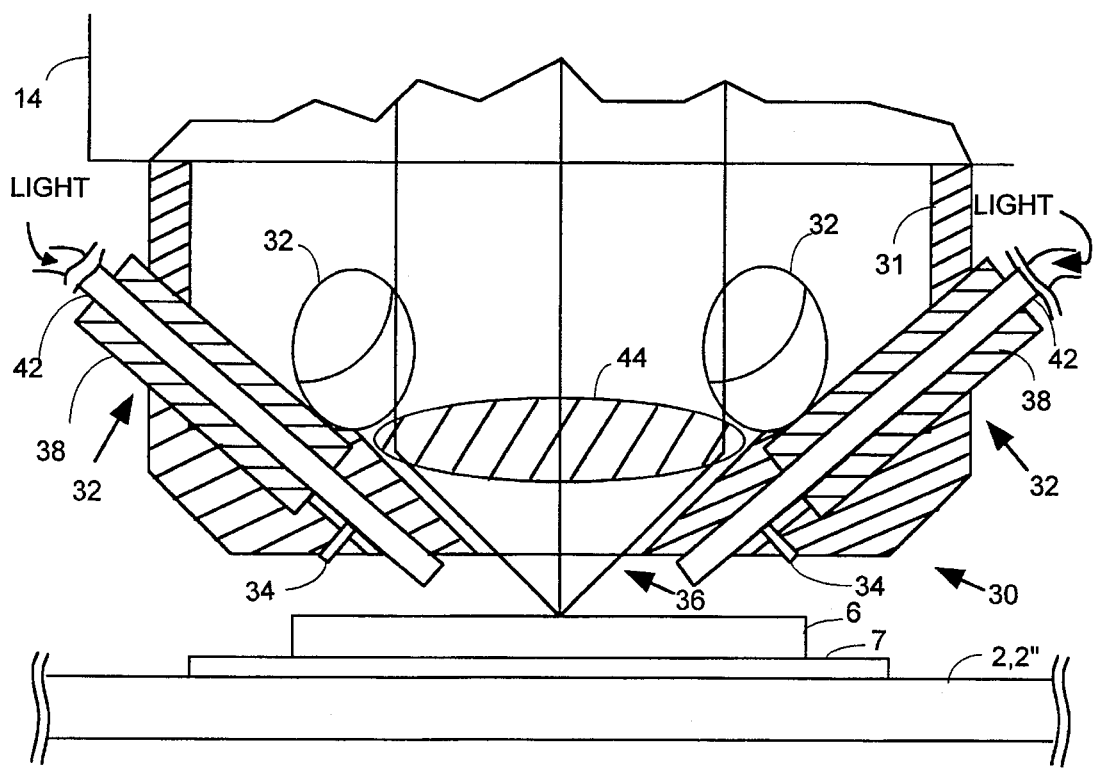
FIG. 8 is a partial cross-sectional view of a portion of the optical system for the second embodiment according to the present invention.

For the single disc or non-transparent disc embodiment relying upon reflected light, FIG. 7 shows the optics of the image reader 18 and the light source 20. The only difference between FIGS. 6 and 7 is the location of the light source 20 on the same side of the disc 2, 2" as the image reader 18. The optics 44–60 of the image reader 18 are the same as in FIG. 6. FIG. 8 shows a sectional view of a cylindrical head section 30 for the image reader 18 that incorporates a portion of the light supplier 42. The fiber optic bundle 42 is secured in a housing 31 via a holder 38 through a hole 32 of the housing. The objective lens 44 is placed in the center of the housing 31 facing the original 6. A small screw 34 fixes the fiber optic bundle 42 in place. If the original 6 is transparent, a white sheet or layer 7 is provided on the main surface of the disc 2 under the original.

Figure 9:
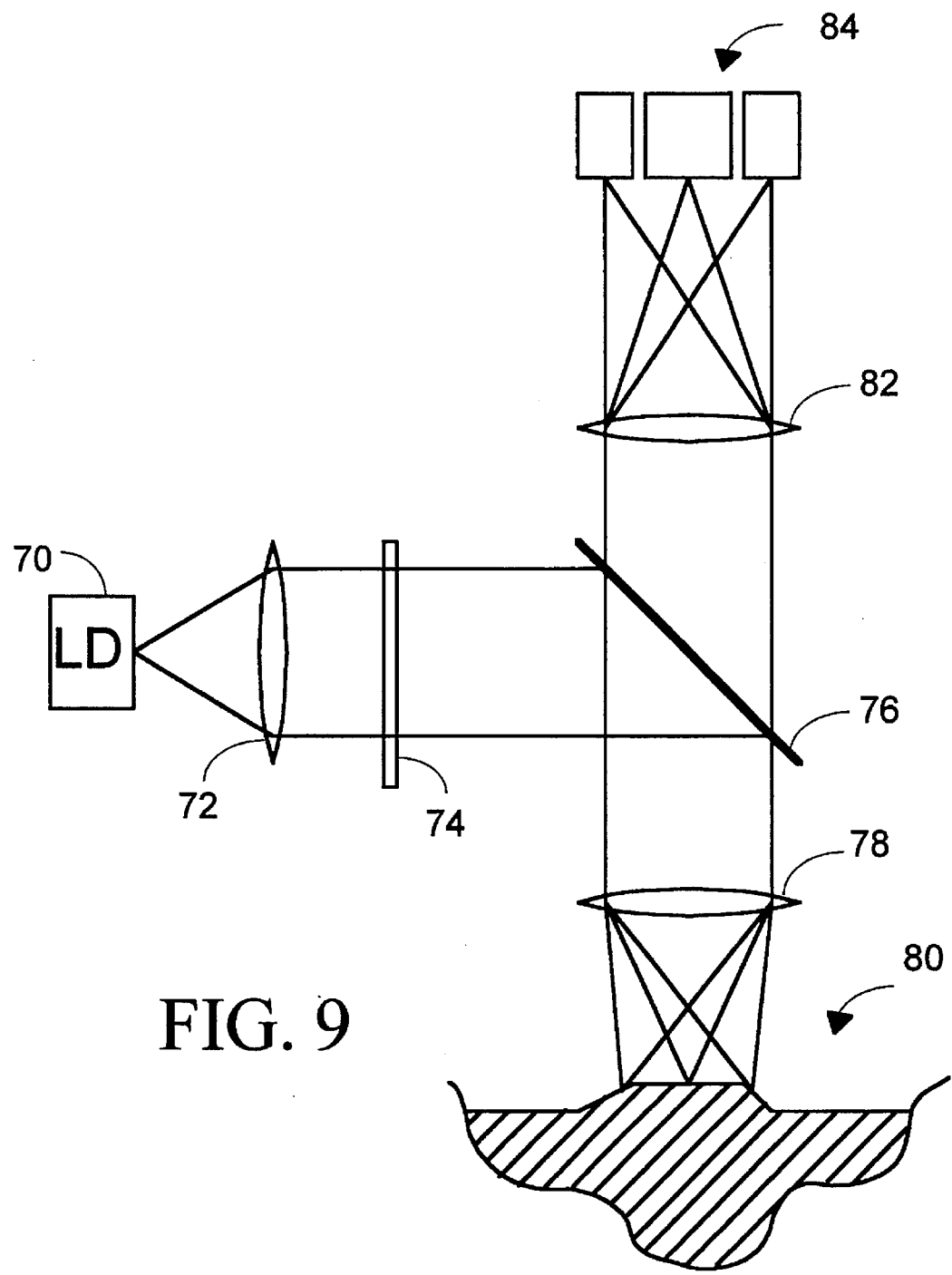
FIG. 9 is a schematic diagram view of an optical position detector for the high resolution scanner according to the present invention.

The optics for the position detector or optical pick-up 24 is shown in FIG. 9. The output ray of a laser diode 70 passes through a lens 72 and a diffraction grating 74, and is reflected by a beam splitter 76. The reflected ray reaches a track portion 80 of the disc 2", 8 via an objective lens 78. The diffraction grating 74 divides the output ray into three beams such that a main beam is applied to the center portion and two sub-beams are applied to respective side portions of the track 80. The main beam provides focus control, and the sub-beams provide accurate tracing of the track 80. The track 80 reflects the beam toward an optical detector 84 via the objective lens 78, the beam splitter 76 and a condenser lens 82. The optical detector 84 has three sections, a center section for the main beam and side sections for the respective sub-beams. The detected beams are used to provide servo control of the control circuit 22. The optics disclosed are based upon the three spot method that is well known to those of ordinary skill in the art of compact or laser disc players.

The control circuit 22 includes an arithmetic unit, such as a microprocessor, that calculates addresses of the image data to store into the frame buffer based upon the bit clock information from the optical pick-up 24 associated with the image data from the reader 18. The image reader 18 reads or scans the image data as polar coordinate data, so that the control circuit 22 converts the read data into rectangular coordinate data. The size, form and position of the original 6, and the number of tracks, track pitch and linear velocity of the disc(s) 2", 8 are known or calculated from the bit clock information so that the control circuit 22 converts the addresses of the data into rectangular coordinate form. The frame buffer stores the image data in the proper addresses so that sequential access to the addresses of the frame buffer provides a rectangular image of the original 6 for displaying on a display device, such as a cathode ray tube (CRT), or for printing on paper by a printer. If the size, form and position of the original 6 are not known, the detection of the ends or sides of the original are performed by the control circuit 22 using well known pattern recognition techniques. For the transparent disc 2 light passing through the disc alone and through the disc plus the original 6 is different, from which the area of the original is determined. For reflective imaging strip reflectors may be provided along the ends or sides of the original 6 and the image reader 18 detects the optical pulses reflected strongly from the strip reflectors so that the control circuit 22 determines the area of the original. The control circuit 22 may be a 320C31 digital signal processor (DSP) manufactured by Texas Instruments, Inc. of Dallas, Tex., United States of America that allows the efficient coordinate conversion process described above.

Thus the present invention as described above has a first arm 14 of a slide structure 12 that includes an image reader 18 for reading the image of the original 6 mounted on the surface of a disc 2, 2" while a second arm 16, which includes a position detector 24 when a track is provided on the opposite surface of the disc, provides the image data with very high accuracy based upon the fine, such as 1.6 micrometer, track pitch on such opposite surface of the disc 2", 8. The spiral track of the disc 2", 8 may be equivalent to what a compact or laser disc has so that the disc is suitable for low cost and mass production. The rotation and movement of the slide structure in the radial direction are controlled accurately with a precision controller or according to the rotation information or bit clock information stored in the spiral track, similar to compact or laser discs, so that the scanner apparatus may have a less precise mechanical configuration than conventional scanners, again allowing low cost manufacturing with reliable scanning. If the common axis between the two discs 2, 8 has some eccentricity, it is offset because the two discs rotate around the same axis and the relative relationship between them is substantially kept constant. The described scanner apparatus therefore is lower cost with less space than the conventional drum type described above in spite of the high resolution.

While the preferred embodiments of the present invention have been shown and described, it is apparent to those skilled in the art that many changes and modifications may be made without departing from the invention in its broader aspects. For example where less accuracy is acceptable, the track 80 on the second surface and the second arm 16 may be dispensed with which still provides the advantages of being able to scan an inflexible original and color depth of the image on the basis of independent pixel reading in space or time described above, although a more expensive, precision drive mechanism for the slide structure 12 is required. Alternatively a tone arm mechanism may be used to move the slide structure 12 in the radial direction of the disc 2, 8. If both arms 14, 16 of the slide structure 12 have light sources 20, then the scanner apparatus of FIGS. 1 and 2 may read both transparent and reflective originals 6.

What is claimed is:

1. A scanner apparatus comprising:

rotatable means having a first surface for mounting an original to be scanned and a second surface having a track;

means for rotating the rotatable mounting means;

a structure comprising a first arm disposed for reading the original on the first surface and a second arm disposed for accurately tracing the track on the second surface;

means for moving the structure radially with respect to the rotatable mounting means; and means for controlling the rotating and moving means so that the first arm reads the original, the controlling means comprising means for regulating the rotating and moving means according to an output from the second arm so that the first arm reads the original at a high resolution.

2. The scanner apparatus as recited in claim 1 wherein the track comprises a spiral track.

3. The scanner apparatus as recited in claim 1 wherein the track on the second surface of the rotatable mounting means comprises means for storing bit clock information so that the rotating means is controlled to rotate the rotatable mounting means at a constant linear velocity.

4. The scanner apparatus as recited in claim 1 wherein the second arm comprises an optical pick-up for accurately tracing the track.

5. The scanner apparatus as recited in claim 1 wherein the rotatable mounting means comprises:

a first disc; and a second disc, the first and second discs being connected to a common axis for rotation together by the rotating means, the first disc having the first surface and the second disc having the second surface.

6. The scanner apparatus as recited in claim 5 wherein the first disc comprises a disc having a transparent portion, the original being mounted on the disc over the transparent portion, and the second arm comprises means for illuminating the original through the transparent portion.

7. A scanner apparatus as recited in claim 5 wherein the original comprises a transparent material.

8. A scanner apparatus as recited in claim 7 wherein the transparent material comprises a photographic film.

9. The scanner apparatus as recited in claim 5 wherein the first disc comprises:

a disc having a cutout region; and a holder removably mounted in the cutout region, the original being attached to the holder.

10. The scanner apparatus as recited in claim 1 wherein the rotatable mounting means comprises a disc selected from the group consisting of a compact disc and a laser disc.

11. The scanner apparatus as recited in claim 1 wherein the controlling means comprises means for converting data read from the original in a polar coordinate format into data in a rectangular coordinate format.

12. The scanner apparatus as recited in claim 1 wherein the first arm comprises an optical reader for reading the original.

13. The scanner apparatus as recited in claim 1 wherein the first arm comprises means for illuminating the original so that the original may be read more efficiently.

14. The scanner apparatus as recited in claim 13 wherein the original comprises an opaque material, and the first arm comprises means for reading the original using reflected light.

15. The scanner apparatus as recited in claim 14 wherein the original comprises a reflective image.

16. The scanner apparatus as recited in claim 13, wherein the original comprises a transparent material and the first arm comprises means for reading the original using reflected light, further comprising a white material between the original and the first surface.

17. The scanner apparatus as recited in claim 16 wherein the original comprises a photographic film.

18. The scanner apparatus as recited in claims 1 or 2 wherein the track comprises means for storing bit clock information so that the regulating means controls the rotating means to rotate the first and second discs together at a constant linear velocity.

\* \* \* \* \*